(12) United States Patent
Tan et al.

(10) Patent No.: US 11,347,479 B2
(45) Date of Patent: May 31, 2022

(54) MEMORY SYSTEM

(71) Applicant: KIOXIA CORPORATION, Tokyo (JP)

(72) Inventors: Mel Stychen Sanchez Tan, Kawasaki Kanagawa (JP); Aurelien Nam Phong Tran, Yokohama Kanagawa (JP); Ryuji Nishikubo, Kawasaki Kanagawa (JP); Norio Aoyama, Machida Tokyo (JP)

(73) Assignee: KIOXIA CORPORATION, Tokyo (JP)

( * ) Notice: Subject to any disclaimer, the term of this patent is extended or adjusted under 35 U.S.C. 154(b) by 264 days.

(21) Appl. No.: 16/802,417

(22) Filed: Feb. 26, 2020

(65) Prior Publication Data

US 2021/0064345 A1    Mar. 4, 2021

(30) Foreign Application Priority Data

Aug. 26, 2019   (JP) .............................. JP2019-153745

(51) Int. Cl.
    *G06F 7/58*       (2006.01)
    *H04L 9/08*       (2006.01)
(52) U.S. Cl.
    CPC ............ *G06F 7/588* (2013.01); *H04L 9/0869* (2013.01); *H04L 2209/12* (2013.01)
(58) Field of Classification Search
    CPC ........ G06F 7/588; G06F 21/602; G06F 21/79; G06F 21/80; G06F 7/58; H04L 9/0869; H04L 2209/12; H04L 9/0894; H04L 9/08; G11C 16/3404; G11C 16/0483; G11C 16/10
    See application file for complete search history.

(56) References Cited

U.S. PATENT DOCUMENTS

| | | | |
|---|---|---|---|
| 9,218,159 B2 | 12/2015 | Seol et al. | |
| 9,223,503 B2 | 12/2015 | Khan et al. | |
| 9,971,566 B2 | 5/2018 | Cambou | |
| 2020/0201785 A1* | 6/2020 | Hanna ................. | G06F 11/1004 |

* cited by examiner

*Primary Examiner* — Quazi Farooqui
(74) *Attorney, Agent, or Firm* — Kim & Stewart LLP

(57) ABSTRACT

A memory system includes a nonvolatile memory and a controller that performs first, second, and third processes on memory cells of the nonvolatile memory. The first process is performed on first memory cells to store a first value therein, such that a highest threshold voltage among the threshold voltages of the first memory cells is set as a first threshold voltage. The second process is performed on second memory cells to store a second value therein, such that a lowest threshold voltage among the threshold voltages of the second memory cells is set as a second threshold voltage higher than the first threshold voltage. The third process performed on third memory cells such that a lowest threshold voltage in the third memory cells is lower than the first threshold voltage, and a highest threshold voltage in the third memory cells is higher than the second threshold voltage.

18 Claims, 6 Drawing Sheets

MEMORY SYSTEM

CROSS-REFERENCE TO RELATED APPLICATION(S)

This application is based upon and claims the benefit of priority from Japanese Patent Application No. 2019-153745, filed Aug. 26, 2019, the entire contents of which are incorporated herein by reference.

FIELD

Embodiments described herein relate generally to a memory system.

BACKGROUND

In a memory system including a nonvolatile memory, a process using a random number, such as encryption of data to be written to the nonvolatile memory, may be performed. At this time, it is desired to improve randomness of the random number efficiently.

DETAILED DESCRIPTION

Figure 1:
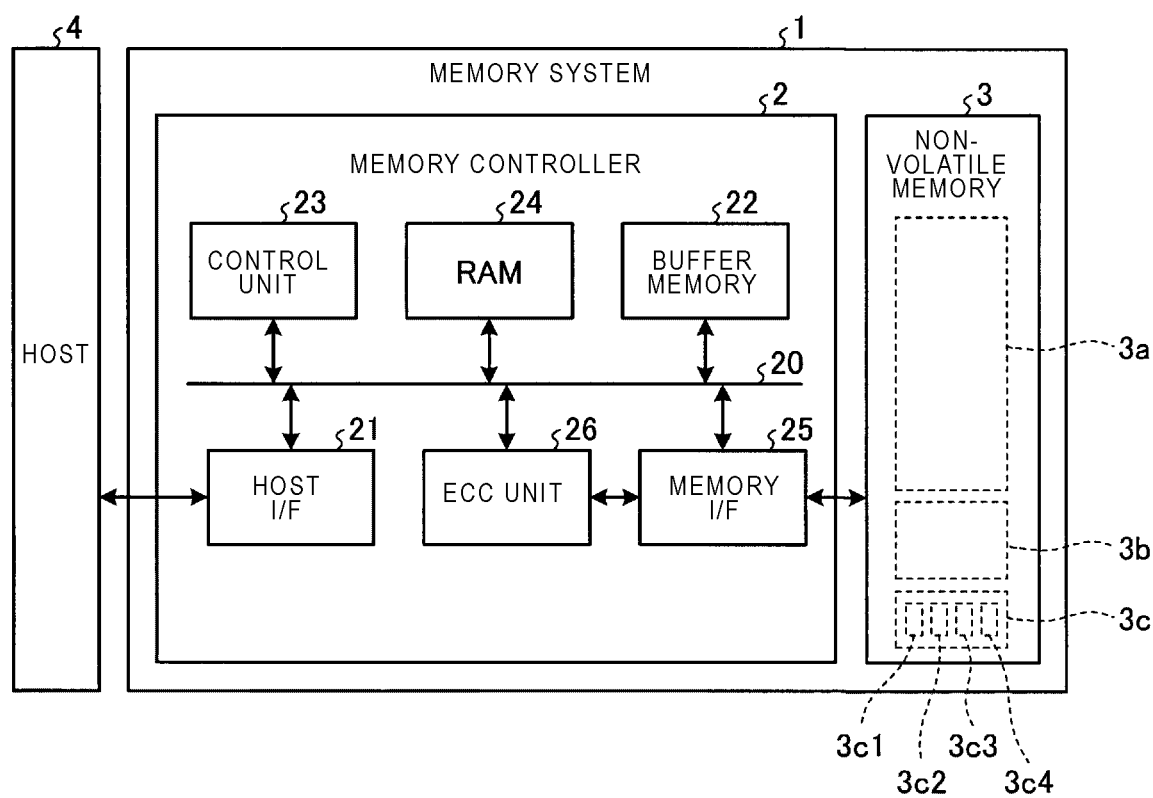
FIG. 1 is a diagram illustrating a configuration of a memory system according to an embodiment.

Embodiments provide a memory system capable of efficiently improving the randomness of a random number.

In general, according to one embodiment, a memory system including a nonvolatile memory and a controller is provided. The nonvolatile memory includes a first storage area and a second storage area. Each of the first storage area and the second storage area includes a plurality of memory cells. The controller performs a first process, a second process and a third process. The first process is performed on a plurality of first memory cells provided in the first storage area. The second process is performed on a plurality of second memory cells provided in the first storage area. The third process is performed on a plurality of third memory cells provided in the second storage area in response to a request for random number. Each of the plurality of memory cells stores a plurality of values according to threshold voltages. The plurality of values include at least a first value and a second value, the second value being adjacent to the first value in relation to the threshold voltage. In the first process, the first value is stored in the plurality of first memory cells, and a highest threshold voltage among the threshold voltages of the plurality of first memory cells is set as a first threshold voltage. In the second process, the second value is stored in the plurality of second memory cells, and a lowest threshold voltage among the threshold voltages of the plurality of second memory cells is set as a second threshold voltage higher than the first threshold voltage. In the third process, a lowest threshold voltage among the threshold voltages of the plurality of third memory cells is made lower than the first threshold voltage, and a highest threshold voltage among the threshold voltages of the plurality of third memory cells is made higher than the second threshold voltage.

Hereinafter, a memory system according to an embodiment will be described in detail with reference to attached drawings. It should be noted that the scope of the present disclosure is not limited by the embodiment described herein.

Embodiment

The memory system according to the embodiment includes a nonvolatile memory. In this memory system, a predetermined process using a random number, such as encryption of data to be written into the nonvolatile memory, may be performed.

In the memory system, a pseudo-random number may be generated and a predetermined process using the generated pseudo-random number may be performed. An advantage of the pseudo-random numbers is that a dedicated hardware random number generator is not necessary, so that manufacturing costs can be reduced. However, in a process that requires high randomness such as an encryption process, there is a possibility that the required randomness cannot be satisfied even when pseudo-random numbers are used.

Therefore, in order to satisfy the required randomness, the memory system is equipped to generate a natural random number (i.e., a true random number), and a predetermined process using the generated natural random number is performed. In order to generate the natural random number, the hardware random number generator is often added into the memory system. In this case, the manufacturing costs of the memory system may be increased. In addition, since additional components are mounted, an area of a chip or a board increases, which may increase a cost of the system.

In the present embodiment, the memory system operates the nonvolatile memory itself as a natural random number generator, thereby achieving both reduction in the cost of the system and improvement in randomness of the random numbers.

Specifically, a predetermined write operation (for example, rough write operation, during which threshold voltages of memory cells subject to the rough write operation are changed to a target threshold voltage level without performing any verification against the target threshold voltage level) that forms a threshold voltage distribution across a specific read level is performed in a predetermined memory area in the nonvolatile memory. As a result, the memory system can generate a natural random number in the predetermined memory area in the nonvolatile memory. That is, in the memory system, the threshold voltage distribution is affected by the randomness due to a natural phenomenon, such as data retention, read disturbance, and program disturbance. Since the threshold voltage distribution is across the specific read level, when a read operation is performed in the predetermined memory area at the specific read level, a read result has randomness due to the natural phenomenon, and becomes data in which "0" and "1" are mixed. Therefore, the read result may be used as the true random number. That is, since the true random number is generated from the nonvolatile memory already mounted in the memory system, it is possible to generate the true random number without adding dedicated hardware random number generator.

More specifically, a memory system 1 may be configured as illustrated in FIG. 1. FIG. 1 is a diagram illustrating a configuration of the memory system 1.

The memory system 1 may be connected to a host 4 via a communication medium (for example, a serial cable), and may function as an external storage device for the host 4 while being connected to the host 4. The memory system 1 may be, for example, a storage device such as a solid state drive (SSD), or a portable memory device such as a memory card. The host 4 may be an electronic apparatus such as a personal computer or a mobile terminal. The memory system 1 includes a memory controller 2 and a nonvolatile memory 3.

The nonvolatile memory 3 stores data in a nonvolatile manner, and is, for example, a NAND flash memory (hereinafter simply referred to as a NAND memory). In the following description, a case where the NAND memory is used as the nonvolatile memory 3 will be given as an example. However, a storage medium other than the NAND memory, such as a 3D structure flash memory, a resistive random access memory (ReRAM), a ferroelectric random access memory (FeRAM), and a magnetoresistive random access memory (MRAM), may be used as the nonvolatile memory 3. Further, the nonvolatile memory 3 is not necessary to be a semiconductor memory, and the present embodiment may be applied to various storage media other than the semiconductor memory.

The memory controller 2 is, for example, a semiconductor integrated circuit configured as a system-on-a-chip (SoC). The memory controller 2 controls a write operation to the nonvolatile memory 3 according to a write request from the host 4. Further, the memory controller 2 controls a read operation from the nonvolatile memory 3 according to a read request from the host 4. The memory controller 2 includes a host interface (I/F) 21, a random access memory (RAM) 24, a memory interface (I/F) 25, a control unit 23, an error check and correct (ECC) unit 26, and a buffer memory 22. The host I/F 21, the memory I/F 25, the control unit 23, the RAM 24, the buffer memory 22 and the ECC unit 26 are connected to each other via an internal bus 20. All functions in the memory controller 2 may be implemented using dedicated hardware, or may be implemented with a processor that executes firmware. Alternatively, some of the functions in the memory controller 2 may be implemented using dedicated hardware, and the rest of the functions may be implemented with the processor that executes the firmware.

The host I/F 21 outputs the write request, the read request, user data, and the like, that are received from the host 4 to the internal bus 20. Further, the host I/F 21 transmits user data read from the nonvolatile memory 3, a response from the control unit 23, and the like to the host 4.

The memory I/F 25 executes the write operation for writing data into the nonvolatile memory 3 and the read operation for reading data from the nonvolatile memory 3 based on an instruction from the control unit 23.

The ECC unit 26 generates parity for error detection and correction by encoding the user data, and also generates a code word including the user data and the parity. Further, the ECC unit 26 decodes a code word read from the nonvolatile memory 3 to restore the user data.

The RAM 24, for example, is a semiconductor memory such as a static RAM (SRAM), and is used as a working memory when the control unit 23 executes processes. The RAM 24 is loaded with firmware and various management tables such as an address conversion table for managing the nonvolatile memory 3 as required.

The control unit 23 integrally controls the memory system 1. The control unit 23 includes, for example, a central processing unit (CPU) and a micro processing unit (MPU).

When receiving a request from the host 4 via the host I/F 21, the control unit 23 performs control according to the request. For example, when a write request from the host 4 is input, the control unit 23 instructs the memory I/F 25 to write user data to the nonvolatile memory 3. When a read request from the host 4 is input, the control unit 23 instructs the memory I/F 25 to read user data from the nonvolatile memory 3.

The buffer memory 22 functions as a memory area for temporarily storing data, such as write user data, read user data, internal management data, and the like. The buffer memory 22 may include, for example, a dynamic RAM (DRAM, including a synchronous DRAM (SDRAM)) or SRAM.

The nonvolatile memory 3 includes a plurality of blocks, and the memory controller 2 may manage data in units derived from the blocks (for example, cluster units obtained by dividing a block into a plurality of sub-blocks). The memory controller 2 allocates a part of the plurality of blocks to a natural random number generation area 3$b$ and a management information storage area 3$c$, and allocates the rest of the blocks to a storage area 3$a$, such that the memory controller 2 may use the blocks respectively. The memory controller 2 generates block management information indicating a result of allocation of each block. The memory controller 2 stores block management information 3$c$4 in the management information storage area 3$c$.

Figure 2:
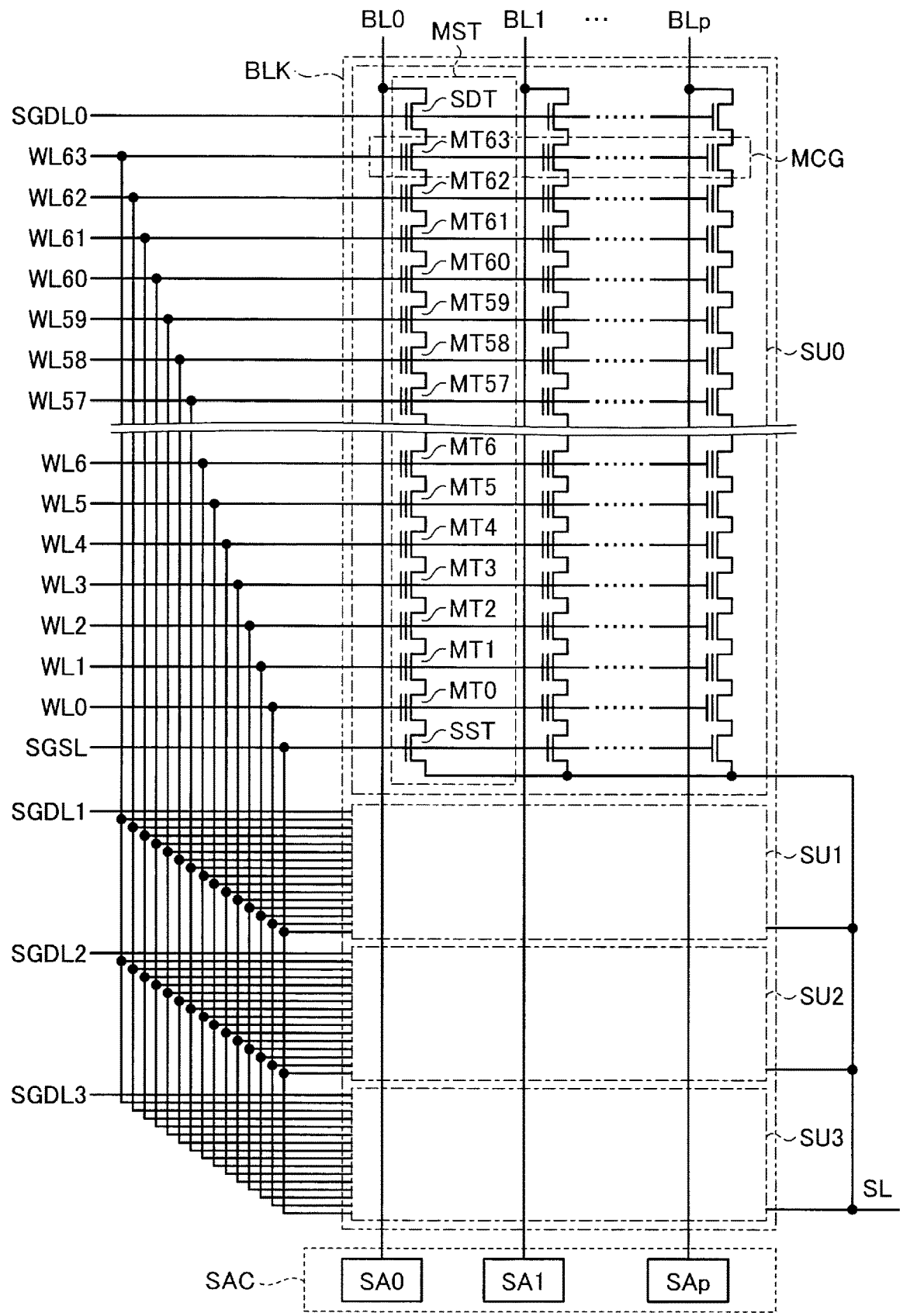
FIG. 2 is a diagram illustrating a configuration and an operation of a nonvolatile memory according to the embodiment.

A block is a unit of data erasing. Each block has memory cells at intersections of a plurality of word lines and a plurality of bit lines that are spaced from each other. FIG. 2 is a circuit diagram illustrating a configuration example of one block.

A block BLK includes a plurality of string units SU0 to SU3. The plurality of string units SU0 to SU3 correspond to a plurality of select gate lines SGDL0 to SGDL3 and share a select gate line SGSL. Each of the string units SU0 to SU3 functions as a drive unit in the block BLK. Each of the string units SU0 to SU3 may be driven by a corresponding select gate line among the plurality of select gate lines SGDL0 to SGDL3 and a corresponding select gate line SGSL. Further, each of the string units SU0 to SU3 includes a plurality of memory strings MST.

Each of the memory strings MST includes, for example, memory cell transistors MT (MT0 to MT63) and select transistors SDT, SST. The memory cell transistor MT includes a control gate and a charge storage film, and stores data in a nonvolatile manner. The 64 memory cell transistors MT (MT0 to MT63) are connected in series between a source of the select transistor SDT and a drain of the select transistor SST. The number of the memory cell transistors MT in the memory string MST is not limited to 64.

Bit lines BL0 to BLp (indicated by BL when each bit line is not distinguished) are connected to the memory string MST. When the select transistor SDT is turned on, channel regions between each memory cell transistor MT in the memory string MST may be conducted to the bit lines BL. A corresponding sense amplifier SA among the plurality of sense amplifiers SA0 to SAp in a sense amplifier circuit SAC is connected to each bit line BL.

Word lines WL0 to WL63 (indicated by WL when each word line is not distinguished) are commonly connected to the control gates of the memory cell transistors MT across memory strings MST in each string unit SU in the block BLK. That is, the control gates of the memory cell transistors MT in each string unit SU in the block BLK are connected to the corresponding word line WL in the same row. That is, the string unit SU of the block BLK includes a plurality of memory cell groups MCG corresponding to the plurality of word lines WL, and each memory cell group MCG includes (p+1) memory cell transistors MT connected to the corresponding word line WL. When each memory cell transistor MT is configured to store a 1-bit value (when operating in a single-level cell (SLC) mode), the (p+1) memory cell transistors MT connected to the corresponding word line WL (that is, the memory group MCG) are treated as one page, and a write operation and a read operation of data are performed for each page.

In some cases, each memory cell transistor MT is configured to store a value of a plurality of bits. For example, when each memory cell transistor MT stores a value of n bits (n>=2), storage capacity per word line WL is equal to a size of n pages. That is, each memory cell group MCG is treated as n pages. Alternatively, in a multi-level cell (MLC) mode in which each memory cell transistor MT stores a 2-bit value, data of two pages is stored in each word line WL. Alternatively, in a TLC (triple-level cell) mode in which each memory cell transistor MT stores a 3-bit value, data of three pages is stored in each word line WL.

The memory controller 2 may perform a first write operation in the SLC mode after performing an erase process on the storage area 3a (see FIG. 1) of the nonvolatile memory 3 in a predetermined block. The first write operation includes a first write condition. For example, the memory controller 2 issues, to the nonvolatile memory 3, a first command that instructs to write data into a certain physical address in the storage area 3a by the first write operation.

Figure 3A:
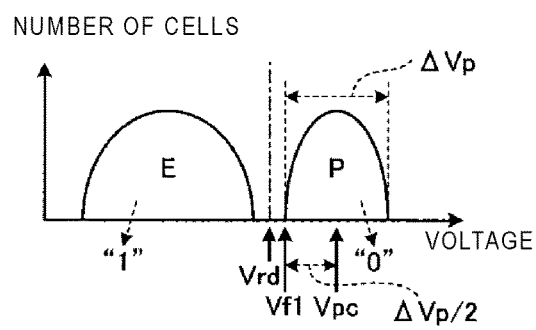
FIGS. 3A to 3E are diagrams illustrating a random number generation operation of the nonvolatile memory according to the embodiment.

In response to the first command, the nonvolatile memory 3 reads write control information 3c1 from the management information storage area 3c (see FIG. 1), and determines the first write condition according to the write control information 3c1. In this case, threshold voltage distribution of the plurality of memory cells is to be as illustrated in FIG. 3A. A plurality of memory cells in an erased state in which no data is written (referred to herein as a plurality of first memory cells) have a threshold voltage distribution indicated by "E", and a plurality of memory cells in a programmed state in which data is written (referred to herein as a plurality of second memory cells) have a threshold voltage distribution indicated by "P". The threshold voltage distribution "P" is formed on a higher voltage side with respect to the threshold voltage distribution "E". The first write condition is a write condition that forms a plurality of threshold voltage distributions (that is, the threshold voltage distribution "E" and the threshold voltage distribution "P") illustrated in FIG. 3A. Each memory cell stores a plurality of values according to threshold voltages. The plurality of values include a first value (for example, a 1-bit value "1" corresponding to the threshold voltage distribution "E") and a second value adjacent to the first value in relation to the threshold voltage (for example, a 1-bit value "0" corresponding to the threshold voltage distribution "P"). The highest threshold voltage among the plurality of threshold voltages which are included in the threshold voltage distribution "E" is defined as VtEmax, and the lowest threshold voltage among the plurality of threshold voltages which are included in the threshold voltage distribution "P" is defined as VtPmin. At this time, an erase process for the plurality of first memory cells is a process in which the highest threshold voltage among the threshold voltages of the plurality of first memory cells is set to VtEmax. An erase process for the plurality of second memory cells and the first write operation thereafter according to the first write condition are processes in which the lowest threshold voltage among the threshold voltages of the plurality of first memory cells is set to VtPmin (>VtEmax).

At this time, the first write operation to each memory cell MT is performed by an incremental step pulse program (ISPP) of alternately repeating write operations and verify operations while increasing a write voltage applied to the word line until a verify operation is passed at a verification level Vf1. The verification level Vf1 is higher than a read level Vrd, and is lower than a target level Vpc at a center of the threshold voltage distribution "P" by a voltage ΔVp/2 that is approximately half of a voltage width ΔVp of the threshold voltage distribution "P". As a result, the threshold voltage distribution "P" can be adjusted appropriately. In addition, the memory controller 2 may update the block management information 3c4 in the block where the first write operation is performed, and store the updated block management information 3c4 in the management information storage area 3c.

The memory controller 2 performs a read operation on the storage area 3a (see FIG. 1) of the nonvolatile memory 3 in the SLC mode. This read operation includes a first read condition. For example, the memory controller 2 issues, to the nonvolatile memory 3, a second command that instructs to read data from a certain physical address in the storage area 3a.

In response to the second command, the nonvolatile memory 3 reads the read control information 3c2 from the management information storage area 3c (see FIG. 1), and determines the first read condition according to the read control information 3c2. In this case, the memory controller 2 reads data from the storage area 3a by using the read level Vrd for the SLC mode. The read level Vrd is between the plurality of threshold voltage distributions (that is, the threshold voltage distribution "E" and the threshold voltage distribution "P"). That is, the first read condition is a read condition that uses the read level Vrd between the plurality of threshold voltage distributions illustrated in FIG. 3A. The highest threshold voltage VtEmax in the threshold voltage distribution "E" is lower than the read level Vrd. The lowest threshold voltage VtPmin (approximately equal to the verification level Vf1) in the threshold voltage distribution "P" is higher than the read level Vrd.

At this time, in the nonvolatile memory 3, a sense node in the bit line BL and the corresponding sense amplifier SA is precharged to a predetermined level, and the read level Vrd is applied to the selected word line WL.

When data is written in the memory cell MT connected to the selected word line WL (e.g., in the case of the threshold voltage distribution "P"), the memory cell MT remains off and a cell current does not easily flow through the bit line BL, so that the voltage of the sense node is maintained. The sense amplifier SA determines that the memory cell MT stores data "0" in response to the voltage of the sense node being maintained. The nonvolatile memory 3 outputs this determination result to the memory controller 2 as read data.

When data is not written in the memory cell MT connected to the selected word line WL (e.g., in the case of the threshold voltage distribution "E"), the memory cell MT is on and the cell current flows through the bit line BL, so that the voltage of the sense node is discharged. The sense amplifier SA determines that the memory cell MT stores data "1" in response to the voltage of the sense node being discharged. The nonvolatile memory 3 outputs this determination result to the memory controller 2 as the read data.

As described above, in the memory system 1, each memory cell MT may use "0" and "1" to represent the threshold voltage thereof. In the memory system 1 of the present embodiment, a natural random number is obtained by using distribution characteristics of the threshold voltage of the memory cells MT as a physical phenomenon.

For example, the memory controller 2 performs a second write operation on the natural random number generation area 3b (see FIG. 1) of the nonvolatile memory 3 in the SLC mode. The second write operation includes a second write condition. For example, the memory controller 2 issues, to the nonvolatile memory 3, a third command that instructs to write data for the natural random number generation (for example, all "0") into a certain physical address in the natural random number generation area 3b by the second write operation.

In response to the third command, the nonvolatile memory 3 reads write control information 3c3 from the management information storage area 3c (see FIG. 1), and determines the second write condition according to the write control information 3c3. In this case, threshold voltage distribution of the plurality of memory cells is to be as illustrated in FIG. 3B.

Figure 3B:
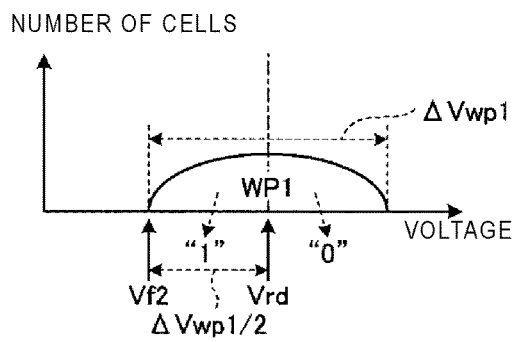

The second write condition is a write condition that forms a threshold voltage distribution (for example, threshold voltage distribution "WP1") across a read level Vrd as illustrated in FIG. 3B. Further, the second write condition may be a condition for roughly writing data into the memory cell MT, and the second write operation may be a rough write operation. When the second write operation is the rough write operation, the second write condition may be a condition that allows a greater variation in the write voltage (applied to the word line) than the first write condition. That is, the threshold voltage distribution (for example, the threshold voltage distribution "WP1") formed under the second write condition may have a wider voltage width of the distribution in comparison with the threshold voltage distribution (for example, threshold voltage distribution "P" illustrated in FIG. 3A) in the programmed state and formed under the first write condition. The lowest threshold voltage (approximately equal to a verification level Vf2) in the threshold voltage distribution "WP1" is lower than the highest threshold voltage VtEmax (see FIG. 3A) in the threshold voltage distribution "E". The highest threshold voltage in the threshold voltage distribution "WP1" is higher than the lowest threshold voltage VtPmin (approximately equal to the verification level Vf1) in the threshold voltage distribution "P".

The third command may be a rough write command that instructs to write the data roughly. In response to the rough write command, the memory controller 2 may roughly write the data into all the memory cells MT in the natural random number generation area 3b. The memory cells in the programmed state where the data is roughly written may have a threshold voltage distribution indicated by "WP1" in FIG. 3B. The threshold voltage distribution "WP1" has a voltage range across the read level Vrd. That is, the second write condition is a write condition that forms the threshold voltage distribution across the read level Vrd (that is, threshold voltage distribution "WP1"). By writing data in the vicinity of the read level Vrd which is the determination threshold voltage of data "0" and "1", the threshold voltage of the memory cell can easily reverse the determination of data "0" and "1" at the time of reading. A read result of the roughly written block is a natural random number including variations due to the natural phenomenon.

At this time, the second write operation (for example, rough write operation) to each memory cell MT is performed by the ISPP of alternately repeating the write operations and the verify operations while increasing the write voltage until the verify operation is passed at the verification level Vf2 according to the second write condition that allows the variation in the write voltage applied to the word line greater than the first write condition. As a result, the threshold voltage distribution "WP1" can be adjusted appropriately. The verification level Vf2 is lower than the read level Vrd by a voltage that is approximately half of the voltage width of the threshold voltage distribution formed under the second write condition (for example, a voltage $\Delta Vwp1/2$ that is approximately half of the voltage width $\Delta Vwp1$ of the threshold voltage distribution "WP1"). In addition, the memory controller 2 may update the block management information 3c4 as to the block where the second write operation is performed, and store the updated block management information 3c4 into the management information storage area 3c.

Figure 3C:
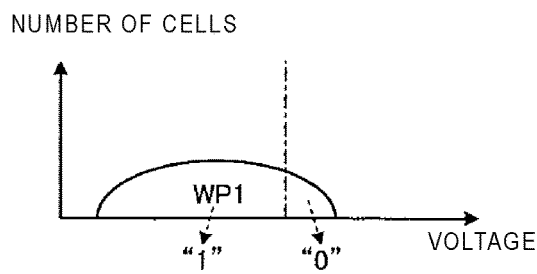
Figure 3D:
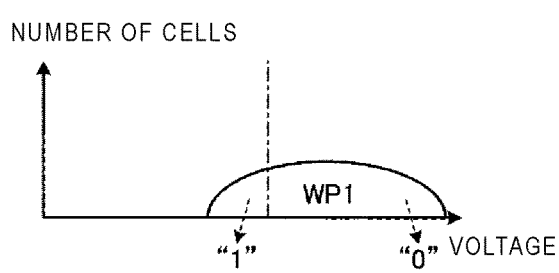

Data read from the roughly written block may change every time the data is read. For example, the threshold voltage distribution "WP1" of the memory cells MT in the block of the natural random number generation area 3b written in the second write operation may be shifted from the state illustrated in FIG. 3B to a low voltage side as illustrated in FIG. 3C, may be shifted from the state illustrated in FIG. 3B to a high voltage side as illustrated in FIG. 3D due to influences of environmental change (for example, changes in ambient temperature and/or changes in operating power). By setting the second write operation as the rough write operation, as illustrated in FIGS. 3B to 3D, even when the threshold voltage distribution shifts due to the influence of the environmental change, the state where the threshold voltage distribution is across the read level Vrd can be maintained.

Even when the shifts of the threshold voltage distributions illustrated in FIGS. 3B to 3D occur, the randomness, as the natural phenomenon, provided in the threshold voltage distribution is maintained. That is, in the threshold voltage distributions illustrated in FIGS. 3B to 3D, the ratio between the bit values "0" and "1" obtained by reading may be different, but a randomness as to which memory cell MT in the threshold voltage distribution takes the bit values "0" or "1" can be equal.

The memory controller 2 performs the read operation on the natural random number generation area 3b (see FIG. 1) of the nonvolatile memory 3 in the SLC mode under the first read condition. For example, the memory controller 2 issues, to the nonvolatile memory 3, a fourth command that instructs to read data from a certain physical address of the natural random number generation area 3b by the read operation.

In response to the fourth command, the nonvolatile memory 3 reads the read control information 3c2 from the management information storage area 3c (see FIG. 1), and determines the first read condition according to the read control information 3c2. In this case, the memory controller 2 reads the data from the natural random number generation area 3b by using the read level Vrd for the SLC mode.

At this time, in the nonvolatile memory 3, the bit line BL and a sense node in the corresponding sense amplifier SA are precharged to a predetermined level, and the read level Vrd is applied to the selected word line WL.

When the memory cell MT connected to the selected word line WL is distributed on the high voltage side (for example, right side of the Vrd in FIG. 3B) relative to the read level Vrd in the threshold voltage distribution "WP1", the memory cell MT remains off and a cell current does not easily flow through the bit line BL, so that the voltage of the sense node is maintained. The sense amplifier SA determines that the memory cell MT stores data "0" in response to the voltage of the sense node being maintained. The nonvolatile memory 3 outputs this determination result to the memory controller 2 as the read data.

When the threshold voltage of the memory cell MT connected to the selected word line WL is distributed on a low voltage side (for example, left side of the Vrd in FIG. 3B) relative to the read level Vrd in the threshold voltage distribution "WP1", the memory cell MT is on and the cell current flows through the bit line BL, so that the voltage of the sense node is discharged. The sense amplifier SA determines that the memory cell MT stores data "1" in response to the voltage of the sense node being discharged. The nonvolatile memory 3 outputs this determination result to the memory controller 2 as the read data.

Thereby, the memory controller 2 uses the distribution characteristics of the threshold voltage of the memory cell MT as the physical phenomenon (natural phenomenon), so that the data including the randomness due to the natural phenomenon may be read from the nonvolatile memory 3, and the natural random number may be obtained.

Figure 3E:
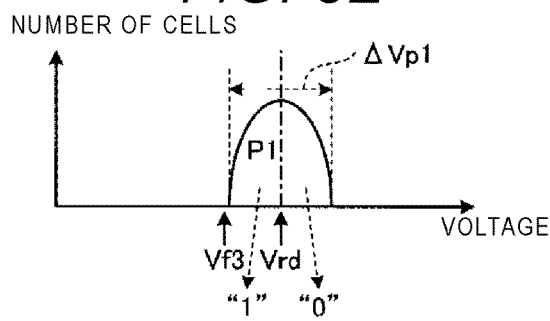

When the influence of the environmental change may be ignored, as illustrated in FIG. 3E, the second write condition may be a condition for writing data into the memory cell MT with a distribution width of the threshold voltage similar to that of the first write condition, the second write operation may be a writing process similar to that of the first write operation except that the write operation is performed aiming at the vicinity of the read level Vrd. That is, the threshold voltage distribution formed under the second write condition (for example, the threshold voltage distribution "P1") may be a threshold voltage distribution that is across the read level Vrd and has a voltage width (for example, the voltage width $\Delta Vp1$ of the threshold voltage distribution "P1" illustrated in FIG. 3E) approximately equal to the distribution width of the threshold voltage of the first write condition (for example, a voltage width $\Delta Vp1 \approx \Delta Vp$ of the threshold voltage distribution "P" illustrated in FIG. 3A).

At this time, the second write operation on each memory cell MT is performed by the ISPP of alternately repeating the write operations and the verify operations while increasing the write voltage applied to the word line until the verify operation is passed at a verification level Vf3. The verification level Vf3 is lower than the read level Vrd by a voltage that is approximately half of the voltage width of the threshold voltage distribution formed under the first write condition. As a result, the threshold voltage distribution "P1" may be adjusted appropriately. The lowest threshold voltage in the threshold voltage distribution "P1" (approximately equal to the verification level Vf3) is lower than the highest threshold voltage in the threshold voltage distribution "E" (see FIG. 3A). The highest threshold voltage in the threshold voltage distribution "P1" is higher than the lowest threshold voltage in the threshold voltage distribution (approximately equal to the verification level Vf1).

The plurality of memory cells that store the first value are not limited to memory cells in the erased state. A plurality of memory cells programmed with specific data may be the plurality of memory cells that store the first value. Even in this case, the second value is adjacent to the first value in relation to the threshold voltage. For example, among four threshold voltage distributions "E", "A", "B", "C" formed by the write operation in the multi-level cell (MLC) mode, rough write operations may be performed in a threshold voltage range across two adjacent threshold voltage distributions other than the threshold voltage distribution "E" in the erased state, and read operations may be performed with a read voltage between the two adjacent threshold voltage distributions. When the two threshold voltage distributions are threshold voltage distributions "A" and "B", for example, the first value is "10" and the second value is "00". When the two threshold voltage distributions are threshold voltage distributions "B" and "C", for example, the first value is "00" and the second value is "01".

Figure 4:
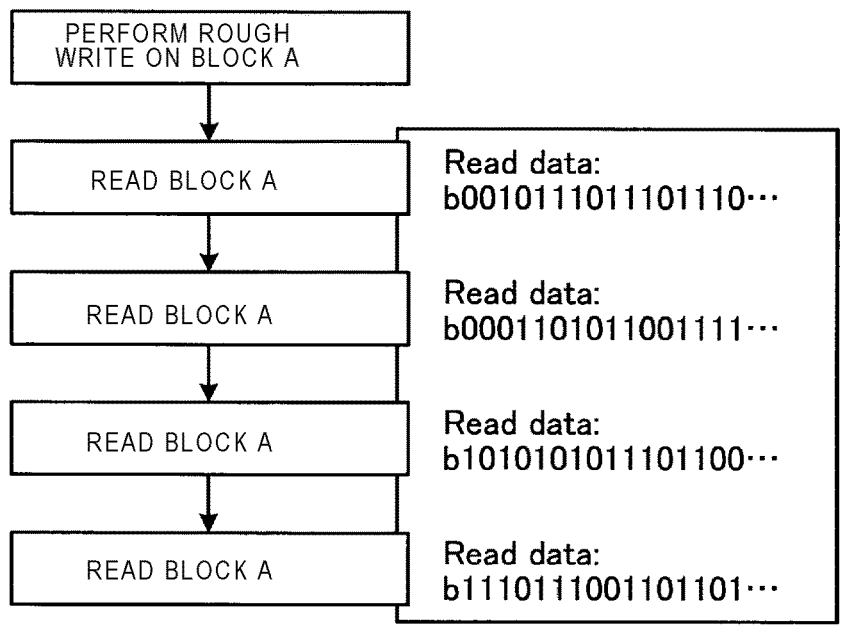
FIG. 4 is a diagram illustrating a random number generation operation of the nonvolatile memory according to the embodiment.

As illustrated in FIG. 4, the memory controller 2 may perform a read operation that reads data from the natural random number generation area 3b a plurality of times. FIG. is a diagram illustrating a random number generation operation of the nonvolatile memory 3, and illustrates an operation of reading data a plurality of times from a block A allocated to the natural random number generation area 3b. FIG. 4 illustrates a case where the read operation is performed four times after the rough write operation (rough write) is performed on the block A. Data (Read data) read from the block A for the first time is "b0010111011101110 . . . ". Data (Read data) read from the block A for the second time is "b0001101011001111 . . . ". Data (Read data) read from the block A for the third time is "b1010101011101100 . . . ". Data (Read data) read from the block A for the fourth time is "b1110111001101101 . . . ". As illustrated in FIG. 4, the data read from the natural random number generation area 3b includes temporal randomness in addition to spatial randomness. For this reason, natural random numbers may also be generated by integrating the read results obtained a plurality of times.

A reason why the read data changes every time the data is read is not only because the read operation is performed at the vicinity of the determination threshold voltage of data "0" and "1" (that is, the read level Vrd), but also because each memory cell is influenced by data retention, program disturb and read disturb. The data retention is a phenomenon that data of a target memory cell changes over time. The program disturb is a phenomenon that data of the memory cell changes by applying a voltage to a word line or a bit line connected to a memory cell to be programmed in the vicinity of the memory cell. The read disturb is a phenomenon that data of a memory cell changes by applying a voltage to a word line connected to a memory cell to be read in the vicinity of the memory cell. Since these characteristics (that is, the data retention, the program disturb, the read disturb) in the nonvolatile memory 3 include randomness due to the natural phenomenon, natural random numbers can be generated by using these characteristics.

Figure 5:
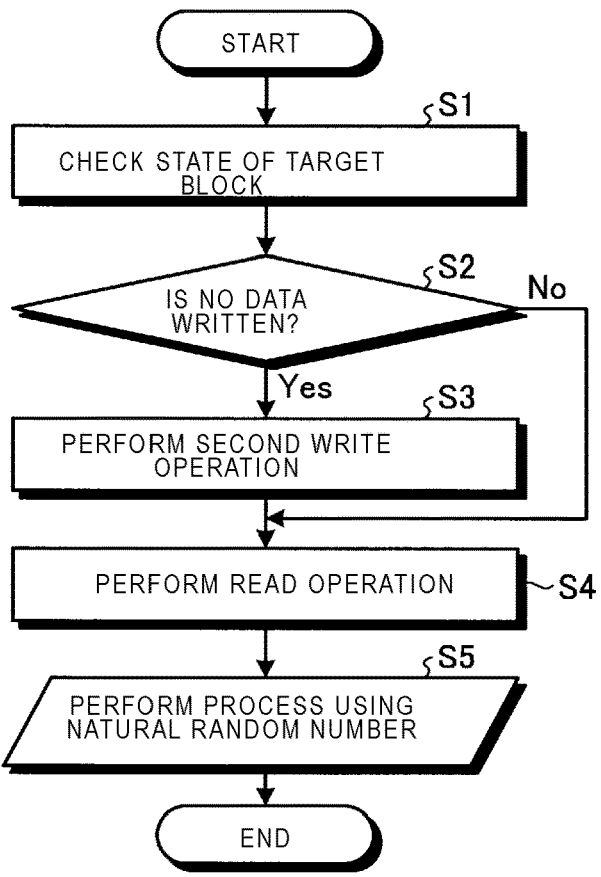
FIG. 5 is a flowchart illustrating the random number generation operation of the memory system according to the embodiment.

Next, an operation of the memory system for generating the natural random numbers will be described with reference to FIG. 5. FIG. 5 is a flowchart illustrating the operation of the memory system.

The memory controller 2 selects a block to be written (target block) from the natural random number generation area 3b of the nonvolatile memory 3 and checks a state of the target block (S1). The memory controller 2 may check the state of the target block by reading the block management information 3c4 from the management information storage area 3c and referring to the block management information 3c4. The memory controller 2 determines whether no data for generating the natural random number (for example, all "0") is written into the target block (S2).

When no data is written into the target block ("Yes" in S2), the memory controller 2 writes data into the target block in the second write operation (S3). When the data is written in the target block ("No" in S2), the memory controller 2 skips step S3. The memory controller 2 reads data from the target block by the read operation using a specific read level, and stores the read result (S4). The memory controller 2 performs a predetermined process using the read result stored in step S4 as a natural random number (S5).

As described above, in the memory system 1 according to the embodiment, the nonvolatile memory 3 itself is operated as the natural random number generator. Accordingly, both the reduction in the cost of the system and the improvement in randomness of the random number can be achieved.

In the memory system 1 according to the embodiment, a natural random number (not a pseudo-random number) using the randomness of the natural phenomenon is obtained as a random number. Since natural random numbers have high entropy, random numbers with less regularity can be generated compared with pseudo-random numbers. An encryption process is preferably performed with the natural random numbers.

Figure 6:
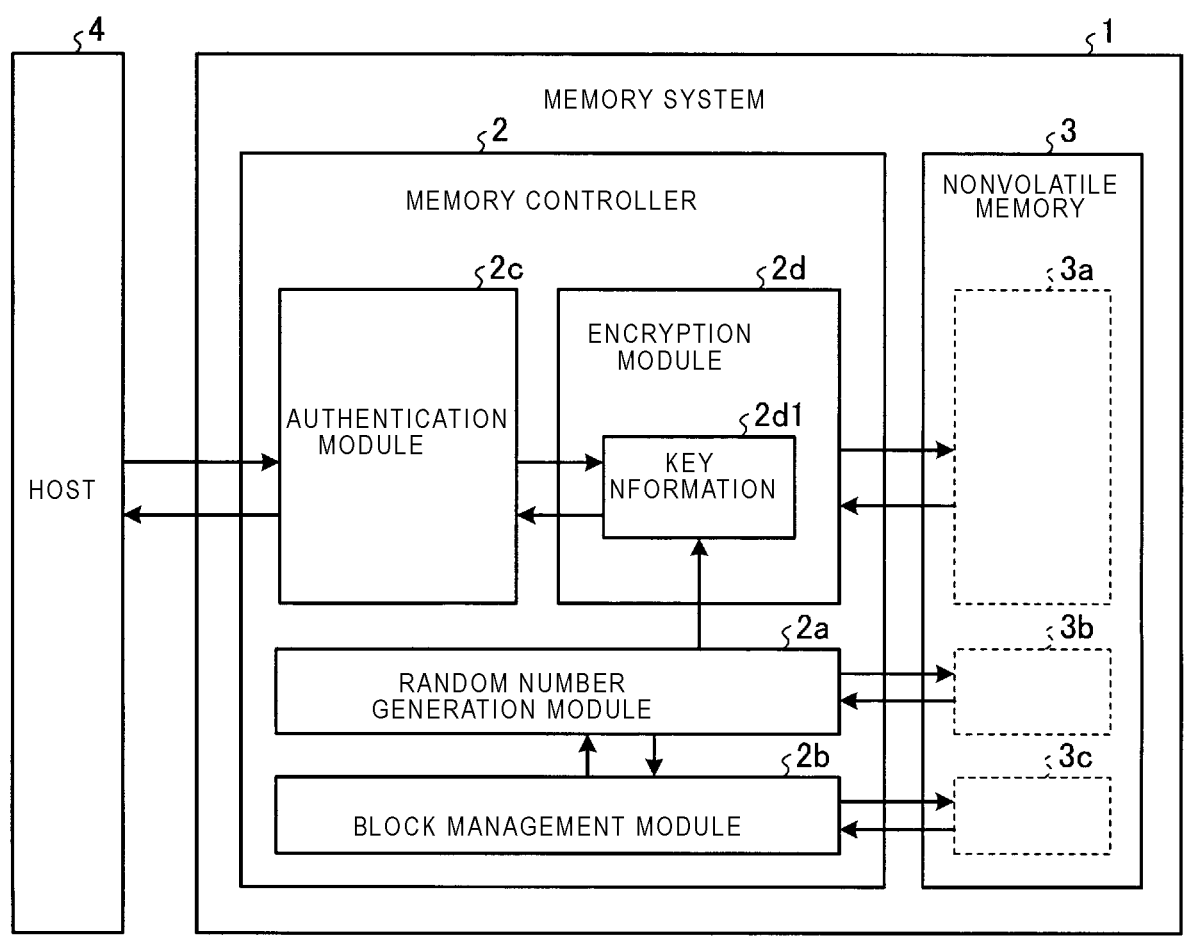
FIG. 6 is a diagram illustrating a configuration for performing an encryption process using random numbers according to a first modification of the embodiment.

The predetermined process performed in step S5 in FIG. 5 may be the encryption process. At this time, the memory controller 2 in the memory system 1 may be functionally configured as illustrated in FIG. 6. FIG. 6 is a diagram illustrating a configuration for performing the encryption process using the random numbers according to a first modification of the embodiment.

The memory controller 2 includes a random number generation module 2a, a block management module 2b, an authentication module 2c, and an encryption module 2d.

The block management module 2b may read the block management information 3c4 from the management information storage area 3c and manage a plurality of blocks in the nonvolatile memory 3. The block management module 2b can know which block is allocated to the storage area 3a, the natural random number generation area 3b and the management information storage area 3c based on the block management information 3c4.

The random number generation module 2a inquires the block management module 2b and identifies a block allocated to the natural random number generation area 3b. The random number generation module 2a performs the process illustrated in FIG. 5 to obtain a natural random number. The random number generation module 2a supplies the obtained natural random number to the encryption module 2d.

The authentication module 2c authenticates the host 4 when the host 4 is connected to the memory system 1 or when identification information of the host 4 is sent from the host 4 to the memory system 1 for the first time. Host management information in which identification information of a connectable host is recorded may be set in the authentication module 2c. The authentication module 2c determines whether the identification information of the host 4 received from the host 4 is provided in the host management information, and determines that the host 4 is a reliable host when the identification information of the host 4 is provided in the host management information.

When the identification information of the host 4 and a host write command are received, the authentication module 2c authenticates the host 4 according to the identification information of the host 4. The host write command includes a write request and write data. When the authentication of the host 4 is successful, the authentication module 2c supplies the host write command to the encryption module 2d.

The encryption module 2d receives the natural random number from the random number generation module 2a and receives the host write command from the authentication module 2c. The encryption module 2d uses the natural random number and generates key information 2d1 for encryption. Since the key information 2d1 is generated by using the natural random number, it may be a pattern with high randomness. The key information 2d1 includes an encryption key. The encryption module 2d encrypts the write data provided in the host write command with the key information 2d1, and writes the encrypted data into the storage area 3a.

When the identification information of the host 4 and a host read command are received from the host 4, the authentication module 2c authenticates the host 4 according to the identification information of the host 4. When the authentication of the host 4 is successful, the authentication module 2c supplies the host read command to the encryption module 2d.

In response to the host read command, the encryption module 2d reads the encrypted data from the storage area 3a. The encryption module 2d decodes the encrypted data with the key information 2d1, and supplies the decoded data to the authentication module 2c.

The authentication module 2c sends the decrypted data to the host 4.

As described above, in the memory system 1, when the nonvolatile memory 3 itself is operated as the natural random number generator to generate a natural random number (true random number), the true random number preferable for encryption can be used, so that reliability of the encryption can be improved.

Figure 7:
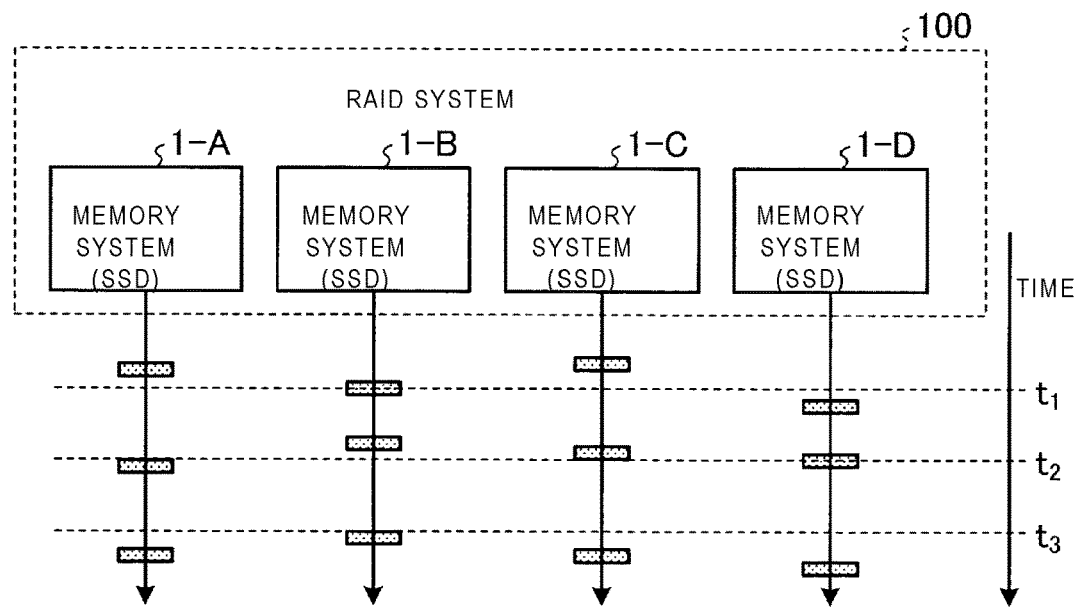
FIG. 7 is a diagram illustrating execution timing of an internal read operation in a RAID system including a memory system according to a second modification of the embodiment.

In addition to encryption, the use of the true random number can lead to improvements in the functionality of the memory system 1. For example, when the memory system 1 is an SSD (solid state drive), a redundant arrays of inexpensive disks (RAID) system 100 may be assembled with a plurality of memory systems 1-A to 1-D as illustrated in FIG. 7. FIG. 7 is a diagram illustrating execution timing of an internal read operation (for example, patrol read operation) in the RAID system 100 including the memory system 1 according to a second modification of the embodiment.

The predetermined process performed in step S5 in FIG. 5 may be a process that schedules the timing of the internal read operation. At this time, it is conceivable to add randomness to the scheduling of the internal read operation of each memory system 1. The patrol read operation is for reading data recorded in the nonvolatile memory 3 of the memory system 1 and periodically detecting whether errors are increased. When the RAID system 100 is used with the memory system 1 of the same model, if all memory systems 1-A to 1-D perform the patrol read operation at the same time, the performance of the RAID system 100 as a whole is deteriorated for host commands. In order to avoid this, timing information using natural random numbers generated in each memory system 1 is generated, and the timing for performing the patrol read operation varies according to the timing information.

Figure 8:
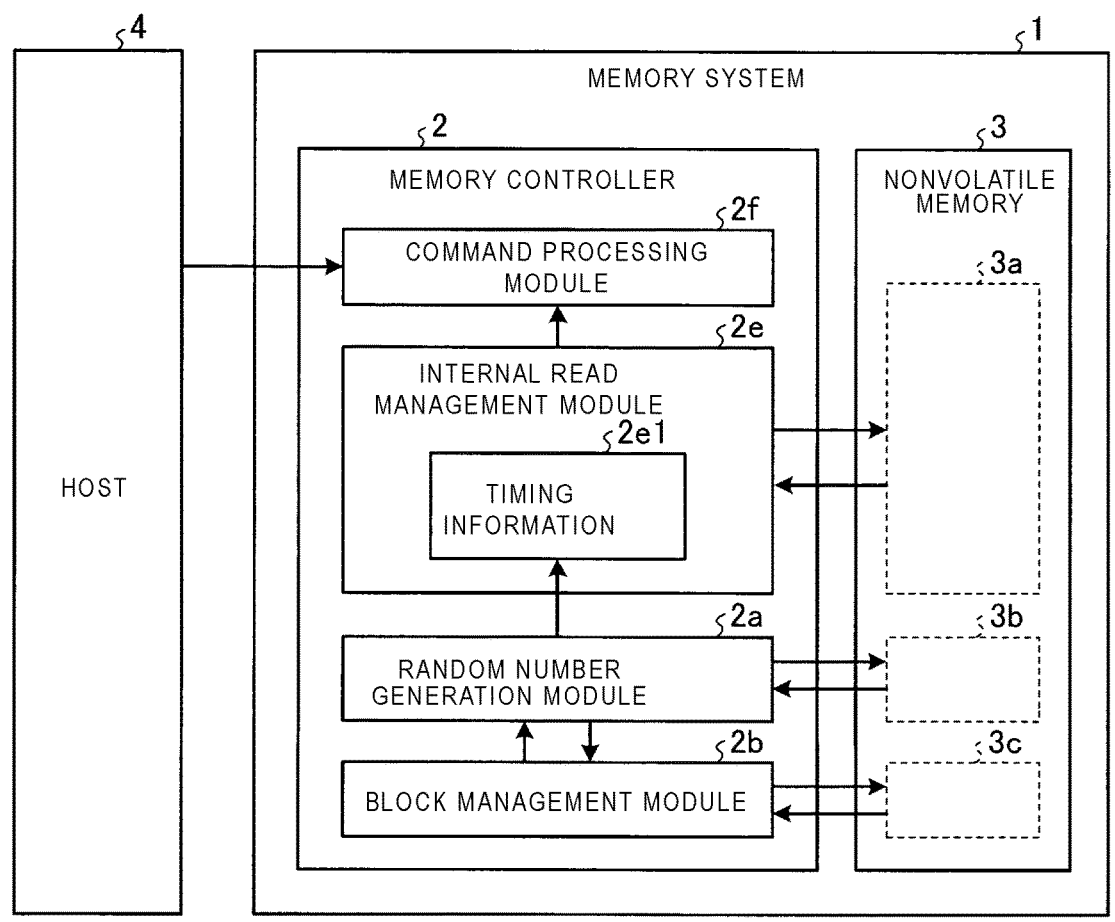
FIG. 8 is a diagram illustrating a configuration for performing the internal read operation using random numbers according to the second modification of the embodiment.

At this time, the memory controller 2 in each memory system 1 may be functionally configured as illustrated in FIG. 8. FIG. 8 is a diagram illustrating a configuration for performing the internal read operation using the random number according to the second modification of the embodiment.

The memory controller 2 includes a random number generation module 2a, a block management module 2b, an internal read management module 2e, and a command processing module 2f.

The block management module 2b may read the block management information 3c4 from the management information storage area 3c and manage the plurality of blocks in the nonvolatile memory 3. The block management module 2b may know which block is allocated to the storage area 3a, the natural random number generation area 3b and the management information storage area 3c according to the block management information 3c4.

The random number generation module 2a inquires the block management module 2b and identifies a block allocated to the natural random number generation area 3b. The random number generation module 2a performs the process illustrated in FIG. 5 to obtain a natural random number. The random number generation module 2a supplies the obtained natural random number to the internal read management module 2e.

The internal read management module 2e receives the natural random number from the random number generation module 2a. The internal read management module 2e generates timing information 2e1 for determining the execution timing of the internal read operation by using the natural random number. Since the timing information 2e1 is generated by using natural random numbers, it may be a pattern with high randomness. The timing information 2e1, for example, may be a timer count target value.

For example, the internal read management module 2e of each memory system 1 in the RAID system 100 starts a timer at the same time, and performs internal read operation (for example, patrol read operation) at the timing when a timer count value matches the count target value indicated by the timing information 2e1. As a result, the internal read operation may be performed at random timing on the plurality of memory systems 1-A to 1-D as illustrated in FIG. 7. In the case of FIG. 7, the plurality of memory systems 1-A to 1-D execute the internal read operation at different timings before and after time t1. The plurality of memory systems 1-A to 1-D execute the internal read operation at different timings before and after time t2. The plurality of memory systems 1-A to 1-D execute the internal read operation at different timings before and after time t3.

In each memory system 1, when the internal read operation is completed, the internal read management module 2e may notify the command processing module 2f of the completion of the internal read operation. As a result, the command processing module 2f becomes ready to execute a host command. The command process module 2f may receive the host command from the host 4 and execute the received host command.

In this way, when constructing the RAID system 100 with the plurality of memory systems 1, by adding randomness to the scheduling of internal read operation (for example, patrol read operation) of each memory system 1, the performance of the RAID system 100 including the plurality of memory systems 1 can be improved as a whole.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
a nonvolatile memory including a first storage area and a second storage area each including a plurality of memory cells; and
a controller configured to perform a first process on a plurality of first memory cells provided in the first storage area, a second process on a plurality of second memory cells provided in the first storage area, and in response to a request for a random number, a third process on a plurality of third memory cells provided in the second storage area, wherein
each of the plurality of memory cells stores a plurality of values according to a threshold voltage, the plurality of values including at least a first value and a second value, the second value being adjacent to the first value in relation to the threshold voltage,
the first process is a process of storing the first value in the plurality of first memory cells and setting a highest threshold voltage among the threshold voltages of the plurality of first memory cells as a first threshold voltage,
the second process is a process of storing the second value in the plurality of second memory cells and setting a lowest threshold voltage among the threshold voltages of the plurality of second memory cells as a second threshold voltage that is higher than the first threshold voltage, and
the third process is a process in which a lowest threshold voltage among the threshold voltages of the plurality of third memory cells is made lower than the first threshold voltage, and a highest threshold voltage among the threshold voltages of the plurality of third memory cells is made higher than the second threshold voltage.

2. The memory system according to claim 1, wherein the controller is configured to use a result read from the second storage area in a read operation using a read level that is higher than the first threshold voltage and lower than the second threshold voltage as the random number.

3. The memory system according to claim 2, wherein the controller is configured to set as the read level a central voltage of a threshold voltage distribution of the plurality of third memory cells.

4. The memory system according to claim 2, wherein the controller is configured to generate key information for encrypting data to be written into the nonvolatile memory by using the result read from the second storage area in the read operation using the read level.

5. The memory system according to claim 2, wherein the controller is configured to generate a timing for reading data from the nonvolatile memory by using the result read from the second storage area in the read operation using the read level.

6. The memory system according to claim 1, wherein a threshold voltage distribution width of the plurality of third memory cells is wider than a threshold voltage distribution width of the plurality of second memory cells.

7. The memory system according to claim 1, wherein the first process is an erase process performed on the plurality of first memory cells.

8. A memory system comprising:
a nonvolatile memory including a plurality of memory cells; and
a controller configured to generate a random number by performing:
a rough write operation on the plurality of memory cells; and
a read operation on the plurality of memory cells after the rough write operation,
wherein a read voltage that is applied during the read operation is set to be higher than a lowest voltage of threshold voltages of the plurality of memory cells on which the rough write operation has been performed by substantially one-half of a width of a range of the threshold voltages of the plurality of memory cells on which the rough write operation has been performed.

9. The memory system according to claim 8, wherein no other write operation is performed on the plurality of memory cells after the rough write operation before the read operation.

10. The memory system according to claim 9, wherein the controller is configured to output results of the read operation as the random number.

11. The memory system according to claim 9, wherein the controller is configured to perform one or more additional read operations after the rough write operation and outputs combined results of the read operations as the random number.

12. The memory system according to claim 8, wherein during the rough write operation, threshold voltages of the plurality of memory cells are changed to a target threshold voltage level without performing any verification against the target threshold voltage level.

13. A method of operating a memory system using a random number, the memory system comprising a nonvolatile memory including a first storage area and a second storage area, each including a plurality of memory cells, said method comprising:
performing a first process on a plurality of first memory cells provided in the first storage area, a second process on a plurality of second memory cells provided in the first storage area, and in response to a request for a random number, a third process on a plurality of third memory cells provided in the second storage area;
performing a read operation on the third memory cells; and
outputting a result of the read operation as the random number, wherein
each of the plurality of memory cells stores a plurality of values according to a threshold voltage, the plurality of values including at least a first value and a second value, the second value being adjacent to the first value in relation to the threshold voltage,
the first process is a process of storing the first value in the plurality of first memory cells and setting a highest threshold voltage among the threshold voltages of the plurality of first memory cells as a first threshold voltage,
the second process is a process of storing the second value in the plurality of second memory cells and setting a lowest threshold voltage among the threshold voltages of the plurality of second memory cells as a second threshold voltage that is higher than the first threshold voltage,
the third process is a process in which a lowest threshold voltage among the threshold voltages of the plurality of third memory cells is made lower than the first threshold voltage, and a highest threshold voltage among the threshold voltages of the plurality of third memory cells is made higher than the second threshold voltage, and
the read operation on the third memory cells is performed using a read level that is higher than the first threshold voltage and lower than the second threshold voltage.

14. The method according to claim 13, further comprising:
setting as the read level a central voltage of a threshold voltage distribution of the plurality of third memory cells.

15. The method according to claim 13, further comprising:
generating key information for encrypting data to be written into the nonvolatile memory by using the result read from the second storage area in the read operation using the read level.

16. The method according to claim 13, further comprising:
generating a timing for reading data from the nonvolatile memory by using the result read from the second storage area in the read operation using the read level.

17. The method according to claim 13, wherein
a threshold voltage distribution width of the plurality of third memory cells is wider than a threshold voltage distribution width of the plurality of second memory cells.

18. The method according to claim 13, wherein
the first process is an erase process performed on the plurality of first memory cells.

* * * * *